March 1, 1966     H. W. BIRK     3,237,470
SPROCKET WHEEL FOR BEAD CHAIN DRIVE
Filed Nov. 7, 1963     2 Sheets-Sheet 1
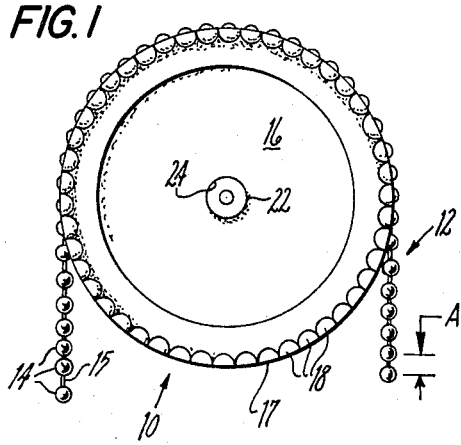
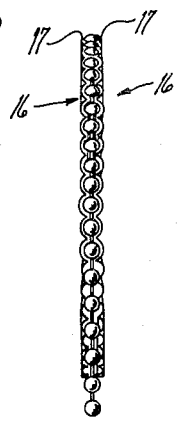
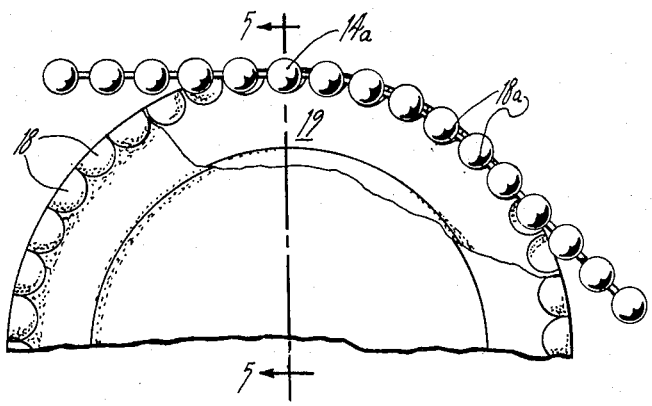
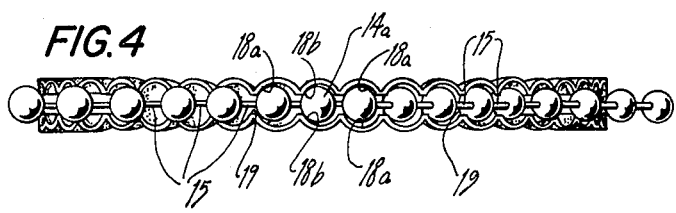
INVENTOR.
HAROLD W. BIRK
By McCormick, Paulding & Huber
ATTORNEYS March 1, 1966  H. W. BIRK  3,237,470
SPROCKET WHEEL FOR BEAD CHAIN DRIVE
Filed Nov. 7, 1963  2 Sheets-Sheet 2
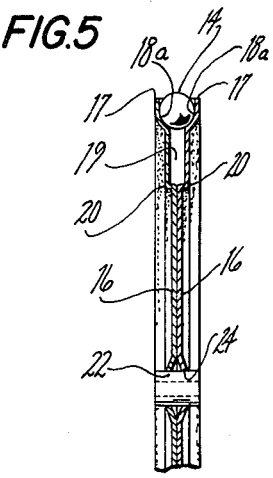
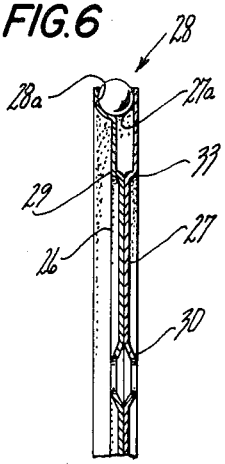
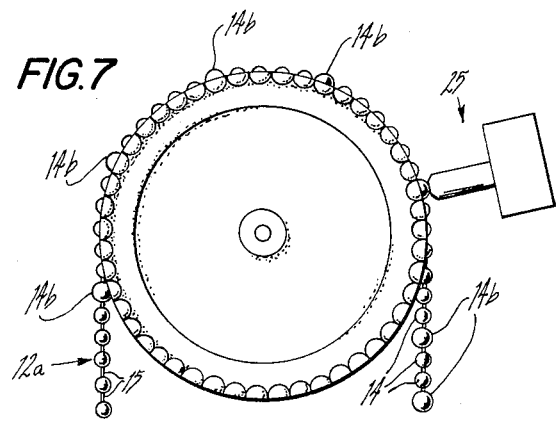
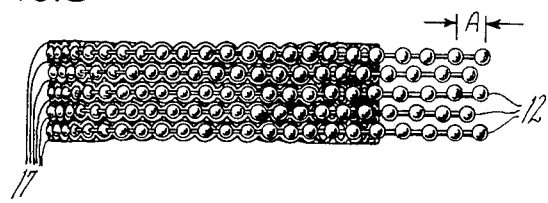

United States Patent Office 3,237,470
Patented Mar. 1, 1966

3,237,470
SPROCKET WHEEL FOR BEAD CHAIN DRIVE
Harold W. Birk, Saunders Point, Niantic, Conn.
Filed Nov. 7, 1963, Ser. No. 322,246
6 Claims. (Cl. 74—229)

This invention relates to bead chain drives and more particularly to an improved sprocket wheel construction for use therewith.

A general object of the present invention is to provide a highly efficient bead chain sprocket wheel which is particularly well suited to low cost quantity production.

Another object of the present invention is to provide a sprocket wheel which can drive or be driven by a bead chain on a very short arc without any slippage occurring between the chain and the sprocket.

A still further object of the present invention is to provide a sprocket wheel which can be assembled from two metal discs of relatively thin sheet metal and joined together by any convenient fastening means as by spot welding or the like.

Another object of the present invention is to provide a sprocket wheel with a series of effective bearing surfaces for the beads of a conventional bead chain whereby greater loads can be carried by said chain than has heretofore been possible.

Another object of the present invention is to provide a sprocket wheel which accommodates a greater degree of misalignment between the bead chain and the sprocket wheel than has heretofore been acceptable.

Another object of the present invention is to provide a sprocket wheel having a minimum axial dimension, which dimension need only be slightly larger than the diameter of the beads in the chain with which the sprocket wheel is to be used.

Another object of the present invention is to provide a sprocket wheel of very light weight.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Of the drawings:

FIG. 1 is a side view of a sprocket of the present invention together with a bead chain of conventional construction;

FIG. 2 is an end view of the FIG. 1 assembly;

FIG. 3 is an enlarged fragmentary side view of a sprocket and chain with a portion of a front disc thereof broken away;

FIG. 4 is a view generally from the top of FIG. 3 but with the front disc shown in full;

FIG. 5 is a sectional view of the FIG. 3 sprocket along line 5—5;

FIG. 6 is a view similar to FIG. 5 but showing an alternative construction of the sprocket;

FIG. 7 shows a sprocket similar to that of FIG. 1 but with a bead chain of less conventional construction specially adapted for use with a sprocket of the present invention; and FIG. 8 shows a series of sprockets such as that shown in FIG. 1 and a like number of bead chains carried thereby so as to form a conveyor belt.

Referring now to the drawings in greater detail, FIGS. 1 and 2 show a bead chain sprocket wheel 10 of the present invention and a conventional bead chain 12 wrapped around a substantial portion thereof. The chain is of well known construction and need not be described in detail herein. It will be seen to comprise a series of beads 14, 14 linked together by a like number of links 15, 15 and has a uniform linear bead pitch as indicated at A in FIG. 1.

The sprocket wheel 10 comprises two concentrically connected circular discs 16, 16 of sheet metal or the like. As shown, these discs are generally similar and define a plurality of bead sockets 18, 18 adjacent to the circumferential edges 17, 17 thereof. A cylindrical hub 22 is shown staked into openings 24, 24 in the discs and serves to connect them to one another.

As shown in FIGS. 3 and 4, the sockets 18, 18 preferably comprise a plurality of equally circumaxially spaced indentations 18a, 18a around the peripheral portions of at least one of said discs. In the construction shown, similar indentations 18a, 18a are correspondingly provided in the other of said discs at an annular portion of the latter which is axially aligned with said first-mentioned indentations. The circumaxial spacing between these indentations is uniform and approximately equal to the linear bead pitch A, and may be somewhat less than this dimension in sprockets where the diameter of the beads is significant as compared with that of the sprocket itself. In the latter case, it is characteristic of bead chains generally that some foreshortening of the chain will occur when it is used around sprockets of relatively small diameter, and hence it will be appreciated that this characteristic may deserve some attention in the design of certain small sprocket wheels embodying the present invention.

As best shown in FIGS. 3 and 4, each of the indentations 18a, 18a is partially spherical or parti-spherical in contour with an internal radius of curvature which is equal to or greater than that of the beads 14, 14. These parti-spherical surfaces extend radially outwardly some distance beyond the centers of the generally spherical beads so that a load bearing bead, such as the bead 14a of FIGS. 3 and 4, will have a reactive force between it and its parti-spherical bearing surface which is so directed that the bead will be restrained in its socket rather than tend to slip out of the socket as would be the case without said radially outwardly extending bearing surface. It is thus a characteristic of a sprocket constructed in accordance with the present invention that at least a portion of the parti-spherical bead bearing surface of each of its sockets lies radially outwardly with respect to a circle constructed through the centers of the beads of a bead chain entered in the sockets.

While each of the above-described parti-spherical indentations is symmetrical about an imaginary radially extending line passing through the disc center and through the center of curvature of said parti-spherical indentations, such symmetry is not essential to the present invention. It is conceivable that in a uni-directional bead chain and sprocket application the advantages of the above-described bead bearing surfaces could be achieved by providing parti-spherical surfaces at the load bearing side of said indentations only. In such as case each sockets defining indentation 19a could be said to include a parti-spherical bead bearing surface 18b comprising only the forward portion thereof as best shown with reference to bead 14a of FIGS. 3 and 4.

From FIG. 5 it will be seen that the socket defining portions of each disc are offset axially to provide an annular channel 19, FIG. 4 shows that this channel serves the important function of providing a space for receiving the links or connecting elements 15, 15 of the bead chain 12. Since the chain is recessed radially in the sprocket wheel 10, as best shown at the top of FIG. 2, this channel is especially significant in a sprocket of the present invention. Another important function of the channel 19 is to decrease the axial extent of the deformation required in forming the indentations 18a, 18a. Each disc has an axial offset 20, best shown in FIG. 5, which permits the parti-spherical indentations formed therein to be only quadri-spherical or comprising approximately one-fourth of a sphere in extent whereby to substantially reduce the tendency of the metal disc to tear during the forming operation. As so constructed, the indentations 18a, 18a and the offset 20 can be formed in the disc periphery in a very economical stamping process or the like.

It will be apparent that several advantages are derived from the above-described construction. First, the sprocket wheel is well suited to low cost quantity production. Second, it can receive a bead chain on a very short arc segment without any slippage between the chain and the sprocket as shown in FIGS. 3 and 4. Third, the chain and sprocket wheel can undergo sudden changes in speed without experiencing any slipping therebetween, even when such speed changes are accompanied by sudden slackening of the chain such as is caused by variations in the load carried by said chain and sprocket.

Other advantages of the present invention will be apparent to those skilled in the art. Examples of use are shown in FIGS. 7 and 8. The former illustrates the versatility of the sprocket wheel 10. Not only can a conventional chain be received thereon, as shown in FIGS. 1 and 3, but said sprocket is also adapted to receive a timing chain 12a. As the wheel 10 rotates, certain oversize beads 14b, 14b trip the microswitch 25, which switch is unaffected by the standard size beads 14, 14. Although the use of such a chain is old in the art, prior uses of the same have required that the timing chain itself carry no load, since the oversize beads will often cause slipping between chain and sprocket. With a sprocket wheel of the present invention, however, the sockets described above may be somewhat larger than the beads themselves and thus will permit the timing chain to be received therein without the slippage usually associated with such a chain. Still further, the sprocket design herein disclosed permits such a timing chain to be received even on a short arc segment of the sprocket without slippage.

FIG. 8 shows still another advantage of the sprocket wheel construction described herein. While the parallel arrangement of bead chains and sprockets to produce a conveyor belt and pulley arrangement is well known in the art, the arrangement shown in FIG. 8 represents a substantial advance over prior art devices in that the narrow axial dimension of each sprocket wheel 10, in combination with the interlocking feature resulting from its serrated circumferential portions 17, 17, permits a very close axial spacing of the bead chains 12, 12. Moreover, the individual shaft attachment problems usually associated with such a configuration are avoided. In the arrangement shown, only one of the sprockets need be attached to the shaft if the other sprockets are axially clamped together. It will be apparent that the conveyor belt formed by the closely spaced bead chains 12, 12 is more suitable for transporting small articles than prior bead chain conveyor belts. Not only are the bead chains 12, 12 more closely spaced axially as a result of the serrated circumferences of the sprockets 10, 10, but the individual beads 14, 14 on adjacent chains 12, 12 will be seen to be staggered by one half the linear bead pitch A so as to further reduce the likelihood of small objects dropping through the conveyor belt.

Finally, FIG. 6 shows an alternative construction for a sprocket of the present invention. As in the FIG. 5 construction, two concentrically connected discs 26 and 27 define a plurality of bead sockets 28, 28 and in this embodiment the discs themselves also define a hub portion 30. Only one of the discs, the disc 26 as shown, is provided with parti-spherical indentations 28a, 28a. This disc is generally similar to the disc 16 of FIG. 5 and has an axially offset portion 29 similar to the axial offset 20 of the FIG. 5 disc. The other disc 27 has a generally planar annular portion 27a which is aligned axially with the indentations 28a, 28a of the disc 26 and together therewith defines the plurality of bead sockets 28, 28. As in the previously described sprocket, these sockets will be equally spaced circumaxially by an amount determined by the linear bead pitch A of the chain.

As shown, the disc has an axial offset 33, but it will be apparent that the second disc 27 might be entirely planar, the annular offset 29 in the first disc 26 serving alone to provide the necessary bead connecting element channel.

The invention claimed is:

1. The combination of a sprocket wheel and a bead chain having a plurality of beads connected to one another, said sprocket wheel comprising a pair of concentrically connected circular discs of sheet metal, at least one of said discs having a plurality of equally circumaxially spaced indentations around its circumference whereby to define with an annular portion of the other disc an annular series of bead sockets, said circumaxial spacing between said indentations being approximately equal to the linear pitch of said bead chain and each of said indentations including a parti-spherical bead bearing surface, said parti-spherical surfaces having a radius of curvature somewhat greater than that of the surface of said beads, and said parti-spherical surfaces extending radially outwardly beyond the centers of the beads when the latter are entered in the sockets.

2. The combination as set forth in claim 1 wherein said other disc has a plurality of indentations spaced circumaxially around its circumference, said indentations corresponding to those of the said one disc and having corresponding parti-spherical surfaces, the pairs of parti-spherical surfaces thus provided serving to define the aforesaid annular series of bead receiving sockets.

3. The combination as set forth in claim 2 wherein each of said discs is offset axially outwardly at a peripheral portion spaced radially inwardly from the indentations thereon whereby to provide an annular channel between the discs at the indentations for receiving bead connecting elements of a bead chain.

4. The combination as set forth in claim 3 wherein each of said parti-spherical surfaces is approximately quadri-spherical.

5. The combination as set forth in claim 1 wherein at least one of said discs is offset axially at a peripheral portion to provide an annular channel between the discs for receiving bead connecting elements of a bead chain.

6. A sprocket wheel as set forth in claim 5 wherein both of said discs are offset axially outwardly at corresponding peripheral portions which are spaced radially inwardly from the indentations on said first mentioned disc, said annular portion of said other disc comprising a generally planar annular surface which is aligned axially with said indentations for defining said bead sockets.

References Cited by the Examiner
UNITED STATES PATENTS

| | | | |
|---|---|---|---|
| 576,105 | 2/1887 | Flindall | 74—216.3 |
| 1,327,925 | 1/1920 | Schneider | 74—243 |
| 1,358,942 | 11/1920 | De Ville | 74—243 |
| 2,408,666 | 10/1946 | Mallard | 74—231 |
| 2,551,821 | 5/1951 | Bengston | 74—243 |
| 2,577,046 | 12/1951 | Svirsky | 74—230.5 X |
| 2,856,752 | 10/1958 | Bahr | 74—243 |

DON A. WAITE, *Primary Examiner.*